United States Patent
Noh et al.

(10) Patent No.: US 9,669,841 B2
(45) Date of Patent: Jun. 6, 2017

(54) CONTROL SYSTEM AND CONTROL METHOD FOR FAIL SAFETY OF MDPS

(71) Applicant: Hyundai Motor Company, Seoul (KR)

(72) Inventors: Yoon Kab Noh, Seongnam-Si (KR); Jong Ho Lee, Incheon (KR); Yang Soo Noh, Hwaseong-Si (KR); Min Woo Han, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/952,633

(22) Filed: Nov. 25, 2015

(65) Prior Publication Data

US 2016/0347351 A1    Dec. 1, 2016

(30) Foreign Application Priority Data

May 29, 2015  (KR) .................. 10-2015-0075819

(51) Int. Cl.
| | | |
|---|---|---|
| *B60W 40/114* | (2012.01) | |
| *B62D 15/02* | (2006.01) | |
| *B62D 5/04* | (2006.01) | |
| *B62D 1/28* | (2006.01) | |

(52) U.S. Cl.
CPC ......... *B60W 40/114* (2013.01); *B62D 1/286* (2013.01); *B62D 5/0481* (2013.01); *B62D 15/021* (2013.01); *B60W 2510/202* (2013.01); *B60W 2520/10* (2013.01)

(58) Field of Classification Search
CPC .... B62D 5/003; B62D 15/021; B60W 40/114; B60W 2510/202; B60W 2520/10
USPC .......................................................... 701/43
See application file for complete search history.

(56) References Cited

U.S. PATENT DOCUMENTS

| | | | | |
|---|---|---|---|---|
| 2004/0107032 A1* | 6/2004 | Farrelly | .................. | B62D 6/04 701/42 |
| 2012/0109414 A1* | 5/2012 | Kumabe | ............. | B60W 50/045 701/1 |

FOREIGN PATENT DOCUMENTS

| | | |
|---|---|---|
| JP | 2870199 B2 | 1/1999 |
| JP | 2890776 B2 | 5/1999 |
| JP | 2003-291842 A | 10/2003 |
| JP | 2005-178572 A | 7/2005 |
| JP | 2010-215219 A | 9/2010 |
| KR | 10-2013-0051224 A | 5/2013 |
| KR | 10-2013-0053637 A | 5/2013 |

* cited by examiner

*Primary Examiner* — McDieunel Marc
*Assistant Examiner* — James E Stroud
(74) *Attorney, Agent, or Firm* — Morgan Lewis & Bockius LLP (57) ABSTRACT

Disclosed are a control system and a control method for fail safety of a motor driven power steering (MDPS). The system may include a straight motion/turning determination module for determining whether a vehicle is in a straight motion or turning based on a steering angle of a steering wheel, a steering torque of the steering wheel and a vehicle speed of the vehicle, a fail determination module for determining whether an MDPS fail occurs based on a steering torque of a driver and a motor torque of the MDPS if the vehicle is in the straight motion, a fail type determination module for determining a type of the MDPS fail using a yaw rate change rate if the MDPS fail occurs, and a yaw rate change rate detection module for inputting the yaw rate change rate to the fail type determination module.

12 Claims, 6 Drawing Sheets

CONTROL SYSTEM AND CONTROL METHOD FOR FAIL SAFETY OF MDPS

CROSS-REFERENCE TO RELATED APPLICATION

The present application claims priority of Korean Patent Application Number 10-2015-0075819 filed May 29, 2015, the entire contents of which application are incorporated herein for all purposes by this reference.

BACKGROUND

Technical Field

The present invention relates to a control system and a control method for fail safety of motor driven power steering (MDPS), and more particularly to a control system and a control method for fail safety of MDPS by which the type of a fail such as a self-steering or no-steering situation may be accurately detected so that the fail safety of the MDPS may be secured.

Background Art

A motor driven power steering (MDPS) is mounted on vehicles that have recently been released to change a steering force of a steering wheel according to travel speeds of the vehicles.

The MDPS is a vehicle speed adaptive power steering apparatus, and functions to provide an optimum steering feeling to the driver according to the travel speed of the vehicle while an ECU of the MDPS controls a steering angle and a motion of a motor according to the vehicle speed of the vehicle.

As components of the vehicles become electronic, an interest in the fail safety of the vehicles has increased, and accordingly, research and development for satisfying ISO26262 which is an international standard has continued even in the field of the MDPS.

In order to satisfy the international standards and improve the fail safety of the MDPS system, an MDPS fail safety measure has been used.

The existing MDPS fail safety method is realized by a fail safety logic that focuses on breakdowns in which an MDPS fail is expected, such as failure related to a sensor signal mainly input to the MDPS, an ECU internal circuit, and a motor, and a current to the motor of the MDPS is immediately interrupted so that the MDPS operation is stopped without considering an overall state of the vehicle including the MDPS.

However, because a fail safety method for monitoring a function added when a new function of the MDPS is added is developed through a method suitable for an automotive safety integrity level (ASIL) and a fail safety logic is added whenever a function of the MDPS is added, the MDPS fail safety system becomes complex.

As various sensors for realizing a fail safety logic are requested whenever a function of the MDPS is added, manufacturing costs increase.

Accordingly, in order to accurately detect a fail of the MDPS (for example, self-steering or no-steering), the fail needs to be detected in consideration of an overall state of the vehicle without adding a separate sensor.

For reference, the self-steering of the MDPS refers to a phenomenon [ASIL: D (very dangerous)] in which a high torque is generated in a motor for MDPS by a fail of the MDPS in a situation in which an input is not made by the driver (straight motion, circular turning driving, or the like) and thus the vehicle unintentionally deviates from a current travel path.

The no-steering of the MDPS refers to a phenomenon [ASIL: C (dangerous)] in which the steering itself cannot be made as a motor torque for MDPS acts reversely while having the same magnitude as the torque of the driver, in spite of a steering input of the driver due to malfunction of the MDPS.

The information disclosed in this Background section is only for enhancement of understanding of the general background of the invention and should not be taken as an acknowledgement or any form of suggestion that this information forms the prior art already known to a person skilled in the art.

SUMMARY OF THE DISCLOSURE

The present invention has been made in an effort to solve the above-mentioned and/or other problems, and an objective of the present invention is to provide a control system and a control method for fail safety of MDPS, by which a fail of the MDPS may be primarily determined and successively the type of the MDPS fail (for example, a self-steering and no-steering situation) may be secondarily determined, in consideration of an overall state of the vehicle, without separately adding sensors, so that the fail safety of the MDPS may be secured.

In one aspect, the present invention provides a control system for fail safety of a motor driven power steering (MDPS), the control system including: a straight motion/turning determination module for determining whether a vehicle is in a straight motion or turning based on a steering angle of a steering wheel, a steering torque of the steering wheel and a vehicle speed of the vehicle; a fail determination module for determining whether an MDPS fail occurs based on a steering torque of a driver and a motor torque of the MDPS, if the straight motion/turning determination module determines that the vehicle is in the straight motion; a fail type determination module for determining a type of the MDPS fail using a yaw rate change rate, if the fail determination module determines that the MDPS fail occurs; and a yaw rate change rate detection module for inputting the yaw rate change rate to the fail type determination module.

The control system of the present invention further includes a motor safety state transition control unit for switching off an MDPS motor according to determination results of the fail determination module and the fail type determination module.

When the vehicle speed is a predetermined value or more, the straight motion/turning determination module determines whether the vehicle is in the straight motion or turning based on absolute magnitudes of the steering torque and the steering angle that have been input.

The fail determination module multiplies the steering torque by the motor torque when the vehicle is in the straight motion to obtain a calculated value, integrates the calculated value over a period of time to obtain an integrated value, and determines that the MDPS fail occurs when the integrated value is a first threshold value or more and the motor torque of the MDPS increases non-proportionally to a second threshold value or more at the same time.

The fail determination module determines a self-steering state when the yaw rate change rate is a third threshold value or more, and determines a no-steering state when the yaw rate change rate is less than the third threshold value.

The yaw rate change rate detection module estimates the yaw rate change rate using the vehicle speed and the steering angle.

In another aspect, the present invention provides a control method for fail safety of a motor driven power steering, the control method including: determining whether a vehicle is in a straight motion or turning based on a steering angle of a steering wheel, a steering torque of the steering wheel and a vehicle speed of the vehicle; determining whether an MDPS fail occurs using a steering torque of a driver and a motor torque of the MDPS, if the straight motion/turning determination module determines that the vehicle is in the straight motion; and determining a type of the MDPS fail by detecting a yaw rate change rate, if it is determined that the MDPS fail occurs.

The control method further includes switching off an MDPS motor according to determination results of the fail determination and the fail type determination using a motor safety state transition control unit.

When the vehicle speed is a predetermined value or more, determining whether the vehicle is in a straight motion or turning is based on absolute magnitudes of the steering torque and the steering angle.

The fail determination includes: multiplying the steering torque by the motor torque when the vehicle is in the straight motion to obtain a calculated value; integrating the calculated value over a period of time to obtained an integrated value; and determining that the MDPS fail occurs when the integrated value is a first threshold value or more and the motor torque of the MDPS increases non-proportionally to a second threshold value or more at the same time.

In the fail type determination, a self-steering state is determined when the yaw rate change rate is a third threshold value or more, and a no-steering state is determined when the yaw rate change rate is less than the third threshold value.

A yaw rate change rate is calculated based on the vehicle speed and the steering angle signal using $$\text{Yaw rate} = \frac{V_x}{L + \frac{K_{us} V_x^2}{g}} \cdot \delta_f,$$

wherein $V_x$ denotes a vehicle speed, L denotes a wheel base, $K_{us}$ denotes an under steer constant, g denotes an acceleration of gravity, and $\delta_f$ denotes a steering angle.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated by the accompanying drawings which are given herein below by way of illustration only, and thus are not limitative of the present invention, and wherein.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
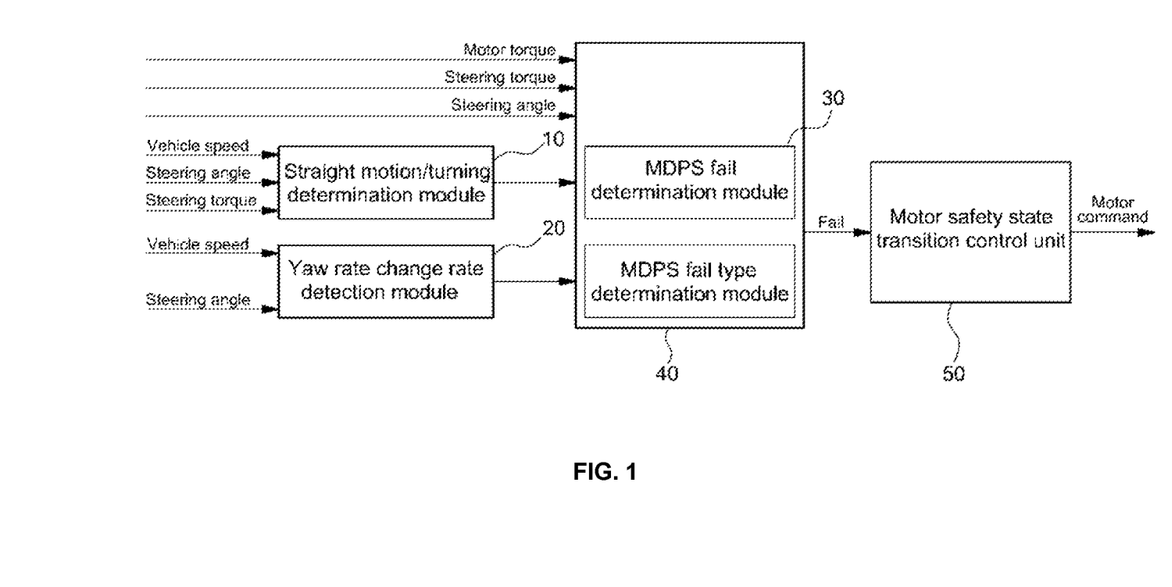
FIG. 1 is a schematic diagram illustrating an exemplary control system for fail safety of an MDPS according to the present invention.
Figure 2:
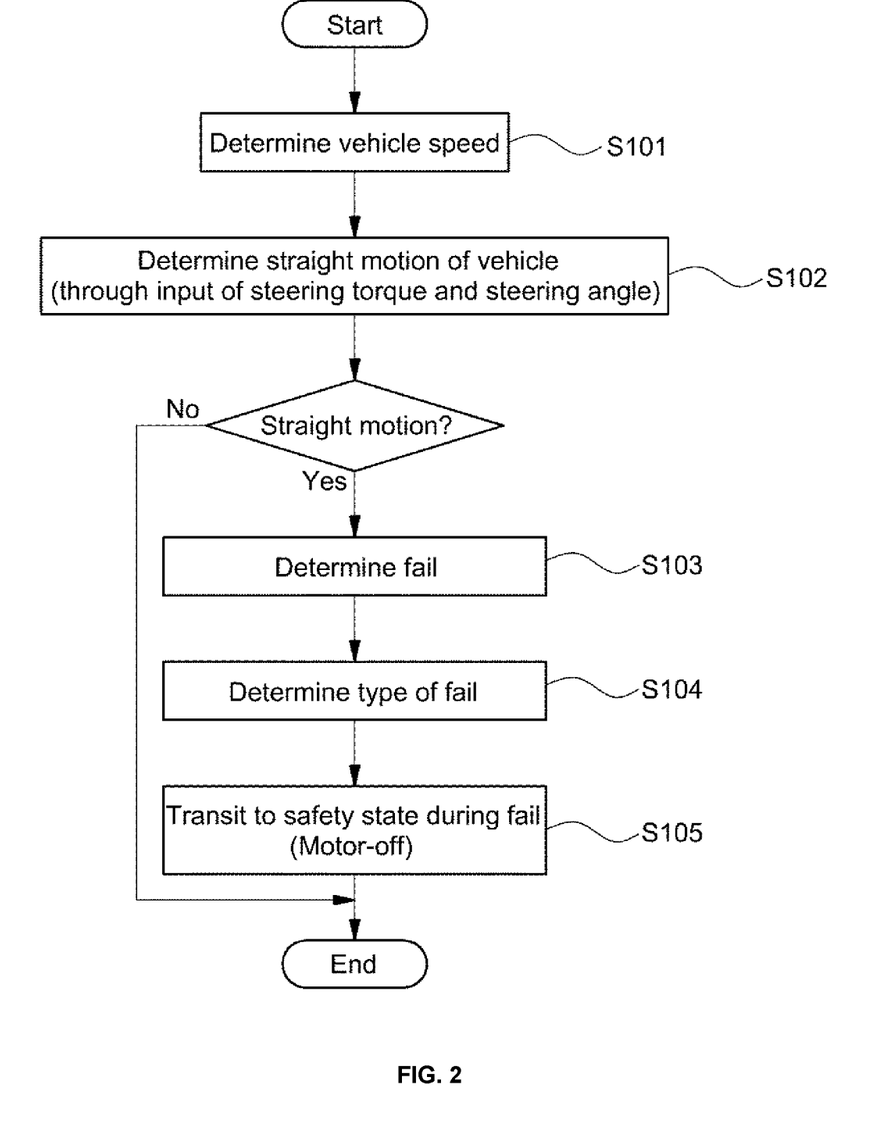
FIG. 2, FIG. 3 and FIG. 4 are flowcharts illustrating an exemplary control method for fail safety of the MDPS according to the present invention.

FIG. 1 is a schematic diagram illustrating a control system for fail safety of an MDPS according to some embodiments of the present invention. FIG. 2 is a flowchart illustrating a control method for fail safety of the MDPS according to some embodiments of the present invention.

First, when a steering angle and a steering torque including a vehicle speed are input to a straight motion/turning determination module 10, the straight motion/turning determination module 10 determines whether the input vehicle speed is a predetermined value or more (S101), and determines whether the vehicle is moved straight or turns using the steering angle and the steering torque (S102).

That is, when a vehicle speed signal from a vehicle speed sensor of the vehicle, a steering angle signal from a steering angle detection sensor for detecting a steering angle of a steering wheel through manipulation of the driver, and a steering torque signal from a steering torque detection sensor for detecting a steering torque of the steering wheel through manipulation of the driver are input to the straight motion/turning determination module 10, the straight motion/turning determination module 10 first determines whether the vehicle speed is a predetermined value or more, and when the vehicle speed is a predetermined value or more, the straight motion or turning of the vehicle is determined based on the absolute magnitudes of the steering torque and the steering angle.

For example, when the steering wheel is in both a neutral state (the steering angel of zero) and a state in which the steering torque is zero, the state of the vehicle is determined as a straight motion, and when the steering angle and the steering torque have (+) or (−) values, the state of the vehicle is determined to be turning.

Next, when the straight motion/turning determination module 10 determines the state of the vehicle as a straight motion, a step of primarily determining whether the MDPS fails using the steering torque of the driver and the motor torque of the MDPS in a fail determination module 30 proceeds (S103).

Figure 3:
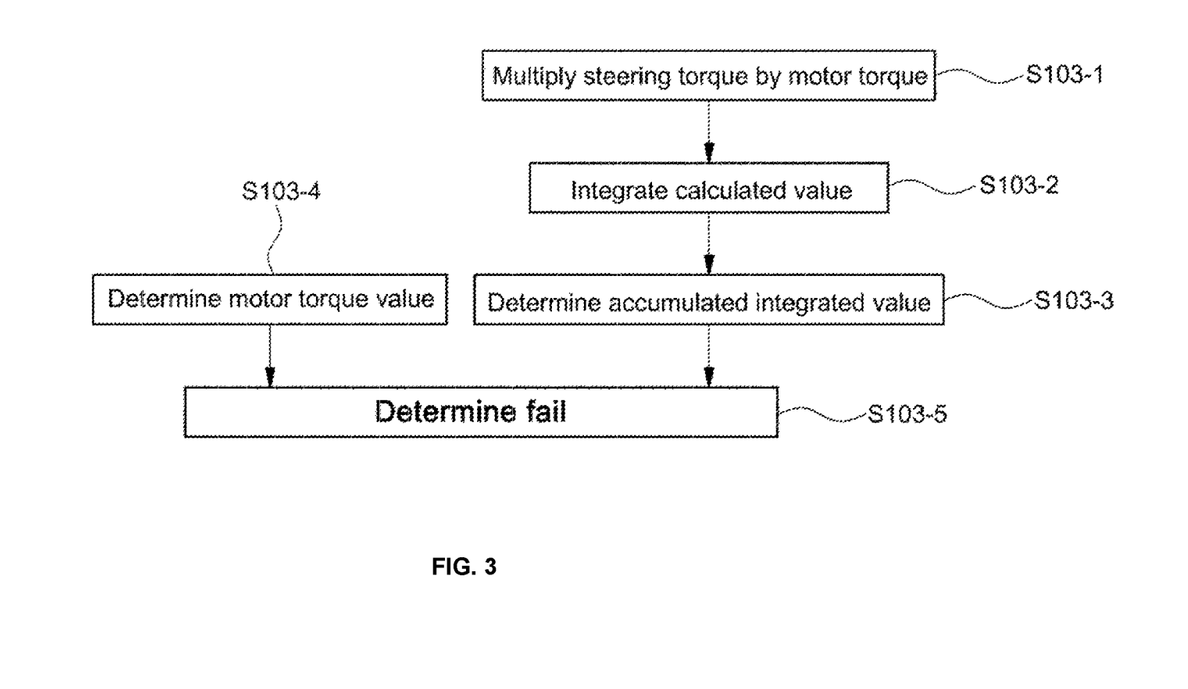

Referring to FIG. 3, in order to primarily determine a fail of the MDPS, the fail determination module 30 multiplies the steering torque from the steering torque detection sensor in the straight motion state of the vehicle by the motor torque from the motor torque sensor for detecting the torque of an MDPS motor (S103-1), and integrates the calculated values (S103-2).

Then, because the steering torque and the motor torque are proportional to each other, it is determined whether the accumulated integrated value obtained by multiplying and integrating the steering torque and the motor torque is a threshold value or more (S103-3).

At the same time, it is determined whether the magnitude of the motor torque instantaneously increases to a threshold value or more (103-4).

Accordingly, when the accumulated integrated value obtained by multiplying the steering torque by the motor torque is a threshold value or more and the magnitude of the motor torque as compared with the steering torque instantaneously increased to a threshold value or more without increasing proportionally, it is determined that the MDPS fails (S103-5).

Figure 6:
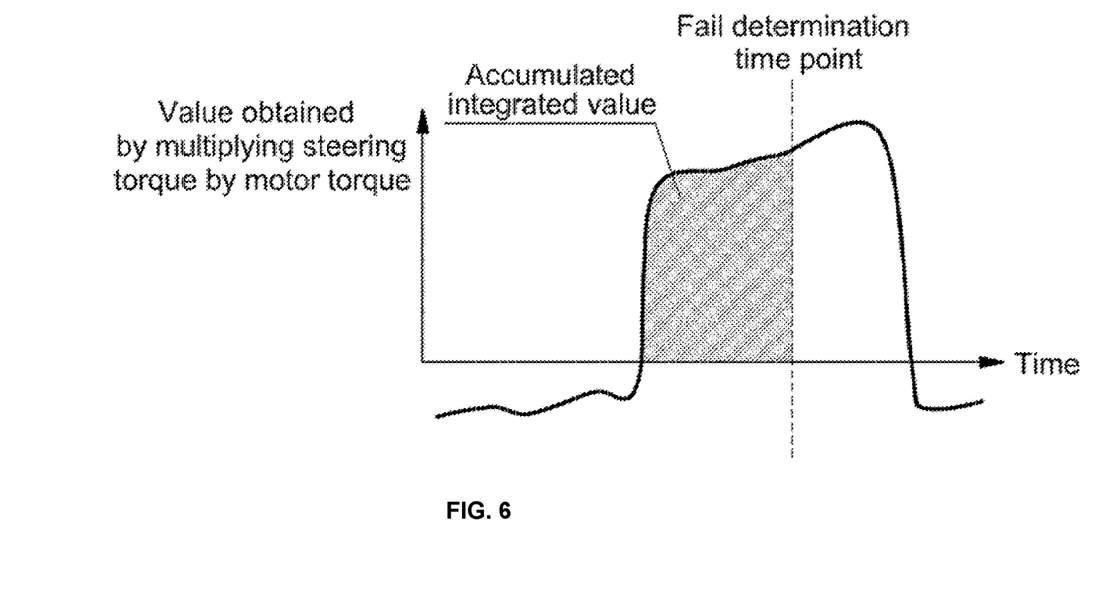
FIG. 6 is a graph illustrating an MDPS fail determination time point in the control method for fail safety of the MDPS according to the present invention.

Meanwhile, as illustrated in FIG. 6 illustrating an example of integrating the values obtained by multiplying the steering torques by the motor torques over time, when the area of the accumulated integrated value is a predetermined value or more, it may be determined that the MDPS fails.

Figure 4:
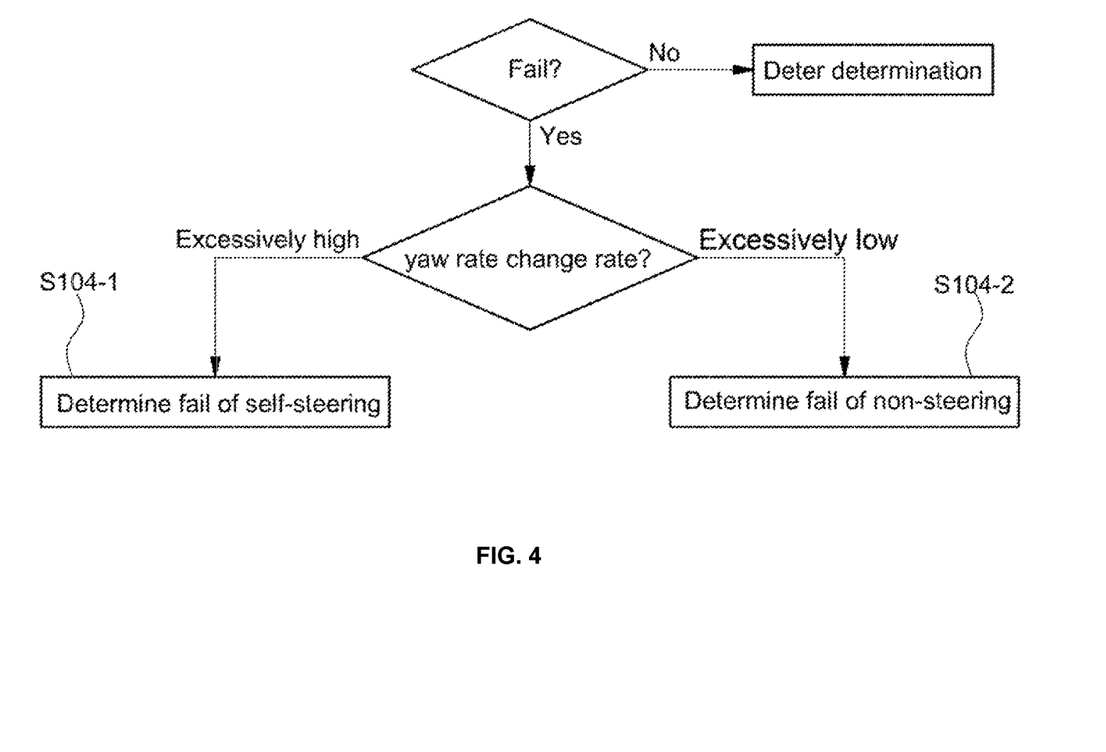

Next, when the fail determination module 30 confirms that the MDPS fails, a fail type determination module 40 secondarily determines the type of the MDPS fail using a yaw rate change rate (S104).

Figure 5:
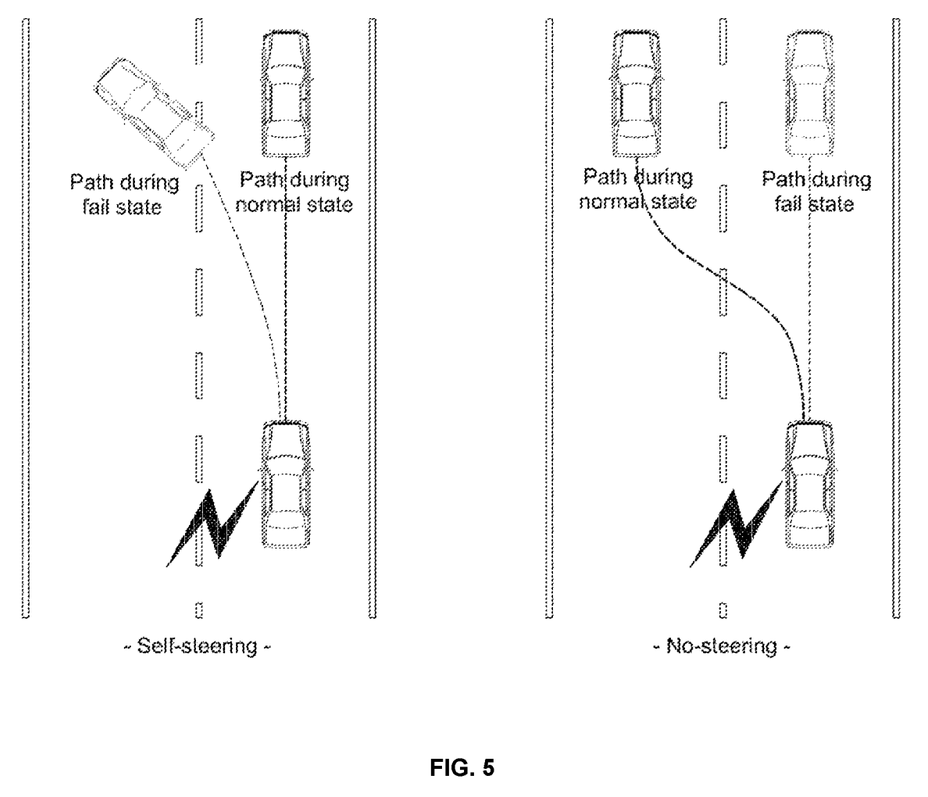
FIG. 5 is a schematic diagram illustrating a self-steering situation and a no-steering situation according to a fail of the MDPS.

Determination of the type of the MDPS fail is to detect a situation in which a vehicle accident may occur in the MDPS fail state, and for example, more stable follow-up measures for the MDPS fail situation may be taken by detecting a self-steering situation and a no-steering situation.

Then, the self-steering refers to a phenomenon in which a vehicle unintentionally deviates from a current travel path due to a high torque generated in a motor for MDPS by malfunction of the MDPS while the vehicle is driven straight without an input of the driver, and the no-steering refers to a situation in which steering itself is impossible as the motor torque for MDPS acts reversely in spite of a steering input of the driver due to malfunction of the MDPS while the vehicle is driven straight.

Accordingly, if the fail determination module 30 confirms the fail of the MDPS, the yaw rate change rate detection module 20 receives a vehicle speed and a steering angle, estimates the yaw rate change rate using Equation 1, and transmits the result to the fail type determination module 40.

$$\text{Yaw rate} = \frac{V_x}{L + \frac{K_{us}V_x^2}{g}} \cdot \delta_f \qquad \text{Equation 1}$$

In Equation 1, $V_x$ denotes a vehicle speed, L denotes a wheel base, $K_{us}$ denotes an under steer constant, g denotes the acceleration of gravity (9.81 m/s$^2$), and $\delta_f$ denotes a steering angle.

Subsequently, the fail type determination module 40 secondarily determines the type of the MDPS fail using the yaw rate change rate from the yaw rate change rate detection module 20, and the fail type determination module 40 determines a self-steering state when the yaw rate change rate is a threshold value or more, that is, excessively high (S104-1) and determines a no-steering state when the yaw rate change rate is less than the threshold value, that is, excessively low (S104-2).

That is, when the yaw rate change rate is a threshold value or more, a self-steering state may be determined as it is assumed that the vehicle unintentionally deviates from the current travel path, and when the yaw rate change rate is less than the threshold value, that is, excessively low, a no-steering state in which the steering itself is impossible may be determined in spite of a steering input of the driver.

Finally, according to the determination results of the fail determination module 30 and the fail type determination module 40, a motor safety state transition control unit 50 performs control to switch off the MDPS motor.

That is, when the fail determination module 30 determines an MDPS fail and the fail type determination module 40 determines the type of the MDPS fail, the motor safety state transition control unit 50 performs control to switch off the MDPS motor for safety.

In this way, because the MDPS fail may be primarily determined and the type of the MDPS fail (for example, a self-steering or no-steering situation) may be secondarily detected as a problematic situation that may occur due to malfunction of the MDPS, the problematic situation (the type of the MDPS fail) of the vehicle may be phenomenologically detected through a vehicle state monitoring function, and the detection result may be used to increase a detection coverage for an MDPS fail and efficiently secure the stability of the MDPS function at the same time.

Through the above-described problems solution, the present invention provides the following effect.

First, a fail of MDPS may be primarily determined and successively the type of the MDPS fail (for example, a self-steering or no-steering situation) may be secondarily detected, in consideration of an overall state information of the vehicle, without separately adding sensors.

Second, because an MDPS fail may be determined and self-steering and no-steering which are accident situations due to the MDPS fail may be determined, a more stable successive measure (for example, switching off an MDPS motor) against the MDPS fail may be taken, and as a result, a functional stability of the MDPS may be secured.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings.

The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control system for fail safety of a motor driven power steering (MDPS), the control system comprising:
    a straight motion/turning determination module for determining whether a vehicle is in a straight motion or turning based on a steering angle of a steering wheel, a steering torque of the steering wheel and a vehicle speed of the vehicle;
    a fail determination module for determining whether an MDPS fail occurs based on a steering torque of a driver and a motor torque of the MDPS, if the straight motion/turning determination module determines that the vehicle is in the straight motion;
    a fail type determination module for determining a type of the MDPS fail using a yaw rate change rate, if the fail determination module determines that the MDPS fail occurs; and
    a yaw rate change rate detection module for inputting the yaw rate change rate to the fail type determination module.

2. The control system of claim 1, further comprising a motor safety state transition control unit for switching off an MDPS motor according to determination results of the fail determination module and the fail type determination module.

3. The control system of claim 1, wherein when the vehicle speed is a predetermined value or more, the straight motion/turning determination module determines whether the vehicle is in the straight motion or turning based on absolute magnitudes of the steering torque and the steering angle that have been input.

4. The control system of claim 1, wherein the fail determination module:
    multiplies the steering torque by the motor torque when the vehicle is in the straight motion to obtain a calculated value;
    integrates the calculated value over a period of time to obtain an integrated value; and
    determines that the MDPS fail occurs when the integrated value is a first threshold value or more and the motor torque of the MDPS increases non-proportionally to a second threshold value or more at the same time.

5. The control system of claim 1, wherein the fail type determination module determines a self-steering state when the yaw rate change rate is a third threshold value or more, and determines a no-steering state when the yaw rate change rate is less than the third threshold value.

6. The control system of claim 1, wherein the yaw rate change rate detection module estimates the yaw rate change rate using the vehicle speed and the steering angle.

7. A control method for fail safety of a motor driven power steering (MDPS), the control method comprising:
    determining, by a straight motion/turning determination module, whether a vehicle is in a straight motion or turning based on a steering angle of a steering wheel, a steering torque of the steering wheel and a vehicle speed of the vehicle;
    determining, by a fail determination module, whether an MDPS fail occurs using a steering torque of a driver and a motor torque of the MDPS, if the straight motion/turning determination module determines that the vehicle is in the straight motion; and
    determining, by a fail type determination module, a type of the MDPS fail by detecting a yaw rate change rate, if it is determined that the MDPS fail occurs.

8. The control method of claim 7, further comprising: according to determination results of the fail determination, switching off an MDPS motor by a motor safety state transition control unit and the fail type determination.

9. The control method of claim 7, wherein when the vehicle speed is a predetermined value or more, determining whether the vehicle is in a straight motion or turning is based on absolute magnitudes of the steering torque and the steering angle.

10. The control method of claim 7, wherein the fail determination comprises:
    multiplying the steering torque by the motor torque when the vehicle is in the straight motion to obtain a calculated value;
    integrating the calculated value over a period of time to obtained an integrated value; and
    determining that the MDPS fail occurs when the integrated value is a first threshold value or more and the motor torque of the MDPS increases non-proportionally to a second threshold value or more at the same time.

11. The control method of claim 7, wherein in the fail type determination, a self-steering state is determined when the yaw rate change rate is a third threshold value or more, and a no-steering state is determined when the yaw rate change rate is less than the third threshold value.

12. The control method of claim 7, wherein a yaw rate change rate is calculated based on the vehicle speed and the steering angle signal using $$\text{Yaw rate} = \frac{V_x}{L + \frac{K_{us} V_x^2}{g}} \cdot \delta_f,$$

wherein $V_X$ denotes a vehicle speed, L denotes a wheel base, $K_{us}$ denotes an under steer constant, g denotes an acceleration of gravity, and $\delta_f$ denotes a steering angle.

* * * * *